(12) United States Patent
Ameen et al.

(10) Patent No.: US 12,515,950 B2
(45) Date of Patent: Jan. 6, 2026

(54) $H_2$ RECOVERY AND $CO_2$ SEPARATION USING MEMBRANE

(71) Applicant: Saudi Arabian Oil Company, Dhahran (SA)

(72) Inventors: Ahmed W. Ameen, Dhahran (SA); Mohammad Saad AlQahtani, Dhahran (SA); Seung-Hak Choi, Incheon (KR); Faisal Abdulrahman Almulhim, Al Hufuf (SA)

(73) Assignee: Saudi Arabian Oil Company, Dhahran (SA)

( * ) Notice: Subject to any disclaimer, the term of this patent is extended or adjusted under 35 U.S.C. 154(b) by 191 days.

(21) Appl. No.: 18/402,277

(22) Filed: Jan. 2, 2024

(65) Prior Publication Data
US 2025/0214836 A1      Jul. 3, 2025

(51) Int. Cl.
*B01D 53/02* (2006.01)
*B01D 53/047* (2006.01)
*C01B 3/56* (2006.01)

(52) U.S. Cl.
CPC .............. *C01B 3/56* (2013.01); *B01D 53/047* (2013.01); *B01D 2256/16* (2013.01);
(Continued)

(58) Field of Classification Search
CPC .......... B01D 2256/16; B01D 2257/504; B01D 2317/025; B01D 53/047; B01D 53/229;
(Continued)

(56) References Cited

U.S. PATENT DOCUMENTS

| 4,229,188 A | 10/1980 | Intille |
| 4,632,818 A | 12/1986 | Chen et al. |

(Continued)

FOREIGN PATENT DOCUMENTS

| CA | 2764156 | 12/2010 |
| CN | 1386563 | 12/2002 |

(Continued)

OTHER PUBLICATIONS

Borraccia et al., "Oxygen enrichment in Sulphur plants to reduce the life cycle costs of new-build, large gas plants," Abu Dhabi International Petroleum Exhibition & Conference, Nov. 2016, 15 pages.
(Continued)

*Primary Examiner* — Christopher P Jones
(74) *Attorney, Agent, or Firm* — Fish & Richardson P.C.

(57) ABSTRACT

A method of treating a gas stream that includes: performing a first pressure swing adsorption (PSA) process generating a first $H_2$-product gas and a first PSA tail gas from a first feed gas, the first PSA tail gas including a residual $H_2$ and $CO_2$; separating $CO_2$ from the first PSA tail gas using a $CO_2$ selective membrane, generating a $CO_2$-rich permeate gas and a $CO_2$-lean rejected gas; performing a second PSA process generating a second $H_2$-product gas and a second PSA tail gas from a second feed gas, the second PSA tail gas including another residual $H_2$; mixing the $CO_2$-lean rejected gas and the second PSA tail gas to generate a mixed tail gas; and separating the residual $H_2$ and the another residual $H_2$
(Continued)

from the mixed tail gas using an $H_2$ selective membrane, generating a recovered $H_2$ permeate gas and a final rejected gas.

20 Claims, 5 Drawing Sheets

(52) U.S. Cl.
CPC .. *B01D 2257/504* (2013.01); *B01D 2317/025* (2013.01); *C01B 2210/001* (2013.01); *C01B 2210/0051* (2013.01)

(58) Field of Classification Search
CPC .... C01B 2203/0233; C01B 2203/0405; C01B 2203/043; C01B 2203/047; C01B 2203/0475; C01B 2210/001; C01B 2210/0051; C01B 3/501; C01B 3/56
See application file for complete search history.

(56) References Cited

U.S. PATENT DOCUMENTS

| | | | |
|---|---|---|---|
| 4,639,257 A | 1/1987 | Duckett et al. | |
| 4,783,203 A | 11/1988 | Doshi | |
| 5,211,923 A | 5/1993 | Harkness et al. | |
| 5,397,556 A | 3/1995 | Towler et al. | |
| 5,435,836 A | 7/1995 | Anand et al. | |
| 6,451,252 B1 | 9/2002 | Ruan et al. | |
| 7,901,578 B2 | 3/2011 | Pruet | |
| 7,994,374 B2 | 8/2011 | Talley et al. | |
| 8,206,669 B2 | 6/2012 | Schaffer et al. | |
| 8,394,174 B2* | 3/2013 | Chen | C01B 3/56 95/55 |
| 8,535,638 B2 | 9/2013 | Terrien et al. | |
| 8,722,003 B1 | 5/2014 | Avagliano et al. | |
| 8,728,325 B2 | 5/2014 | Hussain et al. | |
| 8,771,637 B2 | 7/2014 | Wynn et al. | |
| 8,980,798 B2 | 3/2015 | Tian et al. | |
| 9,149,761 B2 | 10/2015 | Northrop et al. | |
| 9,387,430 B2 | 7/2016 | Ho et al. | |
| 9,630,839 B2 | 4/2017 | Manenti et al. | |
| 9,637,404 B2 | 5/2017 | Minnich et al. | |
| 9,802,153 B2 | 10/2017 | Wojak | |
| 10,384,967 B2 | 8/2019 | Hancock et al. | |
| 10,392,271 B2 | 8/2019 | Janson et al. | |
| 10,414,649 B2 | 9/2019 | Denton et al. | |
| 10,682,606 B2 | 6/2020 | Choi et al. | |
| 10,765,995 B2 | 9/2020 | Hamad et al. | |
| 10,889,915 B2 | 1/2021 | Choi et al. | |
| 10,968,402 B1 | 4/2021 | Raynel et al. | |
| 11,000,778 B2 | 5/2021 | Rithauddeen et al. | |
| 11,008,521 B1 | 5/2021 | Raynel et al. | |
| 11,040,904 B2 | 6/2021 | Herron et al. | |
| 11,131,660 B2 | 9/2021 | Ahmed et al. | |
| 11,161,059 B2 | 11/2021 | Soliman et al. | |
| 11,253,819 B2 | 2/2022 | Choi | |
| 11,260,351 B2 | 3/2022 | Choi et al. | |
| 11,331,632 B2 | 5/2022 | Choi et al. | |
| 11,345,619 B1 | 5/2022 | Lawal et al. | |
| 11,376,524 B2 | 7/2022 | Soliman et al. | |
| 11,385,217 B2 | 7/2022 | Ahmed et al. | |
| 11,406,941 B2 | 8/2022 | Choi et al. | |
| 11,422,122 B2 | 8/2022 | Ahmed et al. | |
| 11,439,957 B2 | 9/2022 | Baig et al. | |
| 11,548,784 B1 | 1/2023 | Raynel et al. | |
| 11,566,715 B1 | 1/2023 | Ben Sultan et al. | |
| 11,571,663 B2 | 2/2023 | Baig et al. | |
| 11,572,274 B2 | 2/2023 | Lithoxoos et al. | |
| 11,638,898 B1 | 5/2023 | Hamad et al. | |
| 11,666,862 B2 | 6/2023 | Lawal et al. | |
| 11,674,241 B2 | 6/2023 | Choi et al. | |
| 11,691,897 B2 | 7/2023 | Soliman | |
| 11,692,143 B1 | 7/2023 | Ansari et al. | |
| 11,724,230 B2 | 8/2023 | Choi et al. | |
| 11,759,766 B1 | 9/2023 | Vaidya et al. | |
| 11,821,543 B2 | 11/2023 | Ben Sultan et al. | |
| 11,885,210 B2 | 1/2024 | Soliman et al. | |
| 11,945,716 B2 | 4/2024 | Lithoxoos et al. | |
| 12,006,233 B2 | 6/2024 | Choi et al. | |
| 12,038,423 B2 | 7/2024 | Khan et al. | |
| 2002/0023538 A1 | 2/2002 | Agarwal et al. | |
| 2004/0010173 A1 | 1/2004 | Agarwal et al. | |
| 2005/0191237 A1 | 9/2005 | Selinger et al. | |
| 2007/0017155 A1 | 1/2007 | Al-Babtain | |
| 2008/0245660 A1 | 10/2008 | Little et al. | |
| 2009/0117024 A1 | 5/2009 | Weedon et al. | |
| 2010/0107685 A1 | 5/2010 | Dragomir et al. | |
| 2010/0129284 A1 | 5/2010 | Niitsuma et al. | |
| 2010/0224561 A1 | 9/2010 | Marcin | |
| 2010/0287981 A1* | 11/2010 | Chen | C01B 3/48 62/619 |
| 2010/0300872 A1 | 12/2010 | Gutsol et al. | |
| 2012/0118011 A1 | 5/2012 | Terrien et al. | |
| 2012/0121497 A1 | 5/2012 | Terrien et al. | |
| 2012/0297665 A1 | 11/2012 | Goerz, Jr. et al. | |
| 2013/0156685 A1* | 6/2013 | Vauk | C01B 3/56 423/652 |
| 2013/0156686 A1* | 6/2013 | Vauk | C01B 3/384 423/652 |
| 2013/0168315 A1 | 7/2013 | Matar et al. | |
| 2014/0357737 A1* | 12/2014 | Abbott | C07C 29/1518 518/704 |
| 2015/0044105 A1 | 2/2015 | Novoselov | |
| 2016/0185596 A1 | 6/2016 | Manenti et al. | |
| 2018/0171249 A1 | 6/2018 | Fridman et al. | |
| 2018/0363978 A1 | 12/2018 | Ballaguet et al. | |
| 2018/0370834 A1 | 12/2018 | Sutton-Sharp | |
| 2019/0022592 A1 | 1/2019 | Choi | |
| 2019/0118114 A1 | 4/2019 | Rithauddeen et al. | |
| 2019/0233972 A1 | 8/2019 | Choi et al. | |
| 2020/0398245 A1 | 12/2020 | Zhang et al. | |
| 2022/0080353 A1 | 3/2022 | Winter et al. | |
| 2022/0144734 A1* | 5/2022 | Ridley, Jr. | C07C 29/1518 |
| 2022/0219975 A1* | 7/2022 | Feinstein | C01B 3/508 |
| 2022/0306463 A1* | 9/2022 | Cruz | F25J 3/0223 |
| 2023/0159409 A1 | 5/2023 | Al-Qahtani | |
| 2023/0182070 A1 | 6/2023 | Hayek et al. | |
| 2023/0183588 A1 | 6/2023 | Al-Qahtani et al. | |
| 2023/0191331 A1 | 6/2023 | Choi et al. | |
| 2023/0191332 A1 | 6/2023 | Choi | |
| 2023/0191339 A1 | 6/2023 | Baroud et al. | |
| 2023/0191340 A1 | 6/2023 | Baroud et al. | |
| 2023/0191369 A1 | 6/2023 | Ahmed et al. | |
| 2023/0192513 A1 | 6/2023 | Al Abdulgader et al. | |
| 2023/0202875 A1 | 6/2023 | Saleh et al. | |
| 2023/0285927 A1 | 9/2023 | Medvedev et al. | |
| 2023/0311056 A1 | 10/2023 | Al Rammah et al. | |
| 2023/0399227 A1* | 12/2023 | Russell | C01B 3/24 |
| 2024/0026117 A1 | 1/2024 | Saleh et al. | |
| 2024/0058757 A1 | 2/2024 | Lawal et al. | |
| 2024/0058758 A1 | 2/2024 | Lawal et al. | |
| 2024/0058759 A1 | 2/2024 | Lawal et al. | |
| 2024/0058760 A1 | 2/2024 | Lawal et al. | |
| 2024/0058761 A1 | 2/2024 | Lawal et al. | |
| 2024/0109034 A1 | 4/2024 | AlQahtani et al. | |
| 2024/0109772 A1 | 4/2024 | Raynel et al. | |
| 2024/0109776 A1 | 4/2024 | AlQahtani et al. | |
| 2024/0124340 A1 | 4/2024 | Soliman et al. | |
| 2024/0150203 A1 | 5/2024 | AlQahtani et al. | |
| 2024/0176932 A1 | 5/2024 | Al Matouq et al. | |
| 2024/0199462 A1 | 6/2024 | Soliman et al. | |
| 2024/0228333 A9 | 7/2024 | Choi et al. | |
| 2024/0248467 A1 | 7/2024 | Alamoudi et al. | |
| 2024/0252977 A1 | 8/2024 | Soliman et al. | |

FOREIGN PATENT DOCUMENTS

| | | |
|---|---|---|
| CN | 106277531 | 1/2017 |
| CN | 110127623 | 8/2019 |
| KR | 102202958 | 1/2021 |

(56) References Cited

FOREIGN PATENT DOCUMENTS

| WO | WO 2013093789 | 6/2013 |
|----|---------------|--------|
| WO | WO 2013121217 | 8/2013 |

OTHER PUBLICATIONS

Dang et al., "Research on Decomposition of Hydrogen Sulfide Using Nonthermal Plasma with Metal Oxide Catalysis," Energy Procedia, 2012, 16(part B):856-862, 7 pages.

DuPont.com [online], "DuPont Ligasep degasification modules," Mar. 2020, retrieved on Jul. 14, 2022, retrieved from URL <https://www.dupont.com/content/dam/dupont/amer/us/en/water-solutions/public/documents/en/45-D02249-en.pdf>, 4 pages.

Foster, "Plasma-based water Purification: Challenges and Prospects for the Future," Physics of Plasmas, 2017, 24:055501, 17 pages.

George et al., "A Review of Non-Thermal Plasma Technology: A novel solution for CO2 conversion and utilization," Renewable and Sustainable Energy Reviews, Aug. 2020, 135, 22 pages.

He et al., "Dielectric Barrier Discharge for Hydrogen Sulphide Waste Gas Decomposition," IOP Conference Series: Earth and Environmental Science, Feb. 2019, 237:22052, 8 pages.

Jarrige et al., "Decomposition of Gaseous Sulfide Compounds in Air by Pulsed Corona Discharge," Plasma Chemistry and Plasma Processing, May 2007, 27:241-255, 15 pages.

Kelland, "A Review of Kinetic Hydrate Inhibitors from an Environmental Perspective," Energy and Fuels, 2018, 32:12001-12012, 39 pages.

Kolbasi, "Oxygen enrichment at Sulphur recovery unit," Refining Community Presentation, May 2018, 27 pages.

Liu et al., "Ni—Mo sulfide semiconductor catalyst with high catalytic activity for one step conversion of CO2 and H2s to Syngas in non-thermal plasma," Catalysts, Jun. 2019, 9(6):525, 13 pages.

Ochered'ko et al., "Plasma-Chemical Conversion of Hydrogen Sulfide in the Atmosphere of Methane with Addition of CO2 and O2," Plasma Chem Plasma Process, Sep. 2017, 12 pages.

Palma et al., "A review about the recent advances in selected nonthermal plasma assisted solid-gas phase chemical processes," Nanomaterials, Aug. 2020, 10:1596, 56 pages.

Papasidero et al., "Improving operability and process understanding of sulfur recovery unit," Chemical Engineering Transactions, May 2012, 26:237-242, 6 pages.

Paskall et al., "Can oxygen enrichment replace tail gas clean up in sulphur recovery?," Sulphur Recovery, Western Research, 8th edition, 2003, Chapter 8-3, 8 pages.

Paskall et al., "So you don't have a COS/CS2 problem, eh?," Sulphur Recovery, Western Research, 8th edition, 2003, Chapter 2-79, 5 pages.

Reddy et al., "Catalytic packed bed non-thermal plasma reactor for the extraction of hydrogen from hydrogen sulfide," International Journal of Energy Research, May 2012, 37(11):1280-1286, 7 pages.

Reddy et al., "Kinetics of hydrogen sulfide decomposition in a DBD plasma reactor operated at high temperature," Journal of Energy Chemistry, 2013, 22:382-386, 5 pages.

Sanito et al., "Degradation of contaminants in plasma technology: An overview," Journal of Hazardous Materials, 2022, 424:127390, 20 pages.

Sato, "Degradation of organic contaminants in water by plasma," International Journal of Plasma Environmental Science and Technology, Mar. 2009, 3(1):8-14, 7 pages.

Singh et al., "Rapid Removal of Poly- and Perfluorinated Compounds from Investigation- Derived Waste (IDF) in a Pilot-Scale Plasma Reactor," Environmental Science & Technology, 2019, 29 pages.

Snoeckx, et al., "Plasma technology—a novel solution for CO2 conversion?," Chem. Soc. Rev., 2017, 46:5805-5863, 59 pages.

Tripodi et al., "Carbon dioxide methanation: design of a fully integrated plant," Energy & Fuels, 2020, 34:7242-7256, 15 pages.

U.S. Appl. No. 18/355,921, Shariff et al., Low Salinity Water Production in Crude Oil Processing, filed Jul. 20, 2023, 34 pages.

U.S. Appl. No. 18/404,401, AlQahtani et al., Simultaneous H2 Production and CO2 Capture From Acid Gas Stream, filed Jan. 4, 2024, 26 pages.

U.S. Appl. No. 18/481,669, Vaidya et al., Process for Controlling CO2 Over H2S Ratio in Oil and Gas Processing Installations, filed Oct. 5, 2023, 41 pages.

U.S. Appl. No. 18/450,815, Saleh et al., Modified Multi-Walled Carbon Nanotubes Including Multi-Walled Carbon Nanotubes and Carboxylate Moieties and Related Methods, filed Aug. 16, 2023, 24 pages.

Wang et al., "Performance Evaluation of Hybrid Gas-Liquid Pulse Discharge Plasma-Induced Degradation of Polyvinyl Alcohol-Containing Wastewater," Plasma Chem Plasma Process, 2014, 34:1115-1127, 13 pages.

Xianjun et al., "Dielectric Barrier Discharge for Hydrogen Sulphide Waste Gas Decomposition," IOP Conf. Series: Earth and Environmental Science, 2019, 237:022052, 8 pages.

Xuan et al., "Plasma oxidation of H2S over non-stoichiometric LaxMnO3 perovskite catalysts in a dielectric barrier discharge reactor," Catalysts, Aug. 2018, 8:317, 14 pages.

Zeghioud et al., "Review on Discharge Plasma for Water Treatment: Mechanism, Reactor Geometries, Active Species and Combined Processes," Journal of Water Process Engineering, 2020, 38, 101664, 13 pages.

Zhao et al., "Highly selective conversion of H2S—CO2 to syngas by combination of non-thermal plasma and MoS2/Al2O3," Journal of CO2 Utilization, 2020, 37:45-54, 10 pages.

Zhao et al., "Production of hydrogen and sulfur from hydrogen sulfide in a nonthermal-plasma pulsed corona discharge reactor," Chemical Engineering Science, 2007, 62:2216-2227, 12 pages.

[No Author Listed], "Gas treatment using microwave technology," Research and Development, Mar.-Apr. 1993, 225:49-51.

International Search Report and Written Opinion in International Appln. No. PCT/US2024/060991, mailed on Jun. 2, 2025, 15 pages.

International Search Report and Written Opinion in International Appln. No. PCT/US2024/062384, mailed on May 28, 2025, 20 pages.

\* cited by examiner

US 12,515,950 B2

H₂ RECOVERY AND CO₂ SEPARATION USING MEMBRANE

TECHNICAL FIELD

This disclosure relates to methods and systems of processing, particularly to hydrogen ($H_2$) recovery and carbon dioxide ($CO_2$) separation using a membrane process.

BACKGROUND

Hydrogen ($H_2$) is an industrially important feedstock and chemical critical to various chemical and refinery processes such as ammonia production, aromatization, hydrodesulfurization, and the hydrogenation or hydrocracking of hydrocarbons. $H_2$ is commercially produced, for example, through reforming of hydrocarbons in refineries. Hydrogen can also be produced by coal gasification, biomass gasification, water electrolysis, or the reforming or partial oxidation of natural gas or other hydrocarbons.

The reforming of natural gas is the most prevalent source of hydrogen production. Bulk hydrogen is typically produced by the steam reforming of natural gas, e.g., methane. Conventional steam reforming includes heating the natural gas in the presence of steam and a nickel catalyst. This endothermic reaction generates carbon monoxide and hydrogen. The carbon monoxide gas can be subjected to a water-gas shift reaction to obtain additional hydrogen, generating carbon dioxide ($CO_2$) as a by-product. Accordingly, $H_2$ purification and $CO_2$ separation from the gas stream is essential steps of a commercial $H_2$ production process.

SUMMARY

An embodiment described herein provides a method of treating a gas stream, where the method includes: performing a first pressure swing adsorption (PSA) process generating a first $H_2$-product gas and a first PSA tail gas from a first feed gas, the first PSA tail gas including a residual $H_2$ and $CO_2$; separating $CO_2$ from the first PSA tail gas using a $CO_2$ selective membrane, generating a $CO_2$-rich permeate gas and a $CO_2$-lean rejected gas; performing a second PSA process generating a second $H_2$-product gas and a second PSA tail gas from a second feed gas, the second PSA tail gas including another residual $H_2$; mixing the $CO_2$-lean rejected gas and the second PSA tail gas to generate a mixed tail gas; and separating the residual $H_2$ and the another residual $H_2$ from the mixed tail gas using an $H_2$ selective membrane, generating a recovered $H_2$ permeate gas and a final rejected gas.

An embodiment described herein provides a gas treatment system that includes: a first pressure swing adsorption (PSA) column to generate a first $H_2$-product gas and a first PSA tail gas from a first feed gas, the first PSA tail gas including $CO_2$ and a residual $H_2$; a $CO_2$ selective membrane, connected to the first PSA column and configured to separate $CO_2$ from the first PSA tail gas, generating a $CO_2$-rich permeate gas and a $CO_2$-lean rejected gas; a second PSA column to generate a second $H_2$-product gas and a second PSA tail gas from a second feed gas, the second PSA tail gas including another residual $H_2$; a tail gas mixer to mix the $CO_2$-lean rejected gas and the second PSA tail gas, generating a mixed tail gas; and an $H_2$ selective membrane to separate the residual $H_2$ and the another residual $H_2$ from the mixed tail gas using an $H_2$ selective membrane, generating a recovered $H_2$ permeate gas and a final rejected gas.

An embodiment described herein provides an $H_2$ recovery system that includes: a steam reformer to generate a first feed gas including $H_2$ and $CO_2$, where a $CO_2$ concentration of the first feed gas is between 10% and 30%; a first pressure swing adsorption (PSA) column to generate a first $H_2$-product gas and a first PSA tail gas from the first feed gas, the first PSA tail gas including the $CO_2$ and a residual $H_2$; a $CO_2$ selective membrane, connected to the first PSA column and configured to separate $CO_2$ from the first PSA tail gas, generating a $CO_2$-rich permeate gas and a $CO_2$-lean rejected gas; an $H_2$ production facility to generate a second feed gas including $H_2$, where a $CO_2$ concentration of the second feed gas is less than 0.1%; a second PSA column to generate a second $H_2$-product gas and a second PSA tail gas from the second feed gas, the second PSA tail gas including another residual $H_2$; a tail gas mixer to mix the $CO_2$-lean rejected gas and the second PSA tail gas, generating a mixed tail gas; an $H_2$ selective membrane to separate the residual $H_2$ and the another residual $H_2$ from the mixed tail gas using an $H_2$ selective membrane, generating a recovered $H_2$ permeate gas and a final rejected gas; and a feed gas mixer to add the recovered $H_2$ permeate gas to the first feed gas.

DETAILED DESCRIPTION

Embodiments described herein provide methods and systems of $H_2$ recovery and $CO_2$ separation, particularly for residual $H_2$ recovery from multiple pressure swing adsorption (PSA) tail gases. Generally, $H_2$ in refinery is produced from reforming naphtha or hydrocarbon as an off-gas with $H_2$ concentration about 70-90%. The rest of gases in the off-gas are mainly hydrocarbons, e.g., un-converted feedstock, with traces of hydrogen sulfide ($H_2S$). $H_2S$ in the off-gas is typically removed using $H_2S$ selective absorption. The sweet off-gas after the $H_2S$ removal can be then sent to a PSA unit to produce pure $H_2$. In the typical PSA unit, hydrocarbons are adsorbed using molecular sieves and other adsorbents while $H_2$ are passing through the adsorbent beds and exiting the process at concertation above 99%. Beside producing the pure $H_2$ stream, another stream as a PSA tail gas is produced during the desorption step. The PSA tail gas stream has $H_2$ content about 40-50% and used mostly as a fuel gas. It is therefore desired to recover the residual $H_2$ from the PSA tail gas to improve the overall $H_2$ production efficiency and yield. In many refineries, additional $H_2$ production is needed to meet its $H_2$ demand. For example, a steam reforming (SR) can be used in addition to $H_2$ recovery from the refinery off-gas. The SR product gas stream typically contains about 70% $H_2$, about 20% $CO_2$, and about 7% methane or other hydrocarbon, and about 3% carbon monoxide (CO). One common PSA column can be used to purify both the SR outlet and the refinery off-gas by mixing both the streams. Alternately, two PSA columns can be used to separately treat the two $H_2$-containing streams. This two-PSA process typically achieves about 85% $H_2$ recovery.

Figure 1:
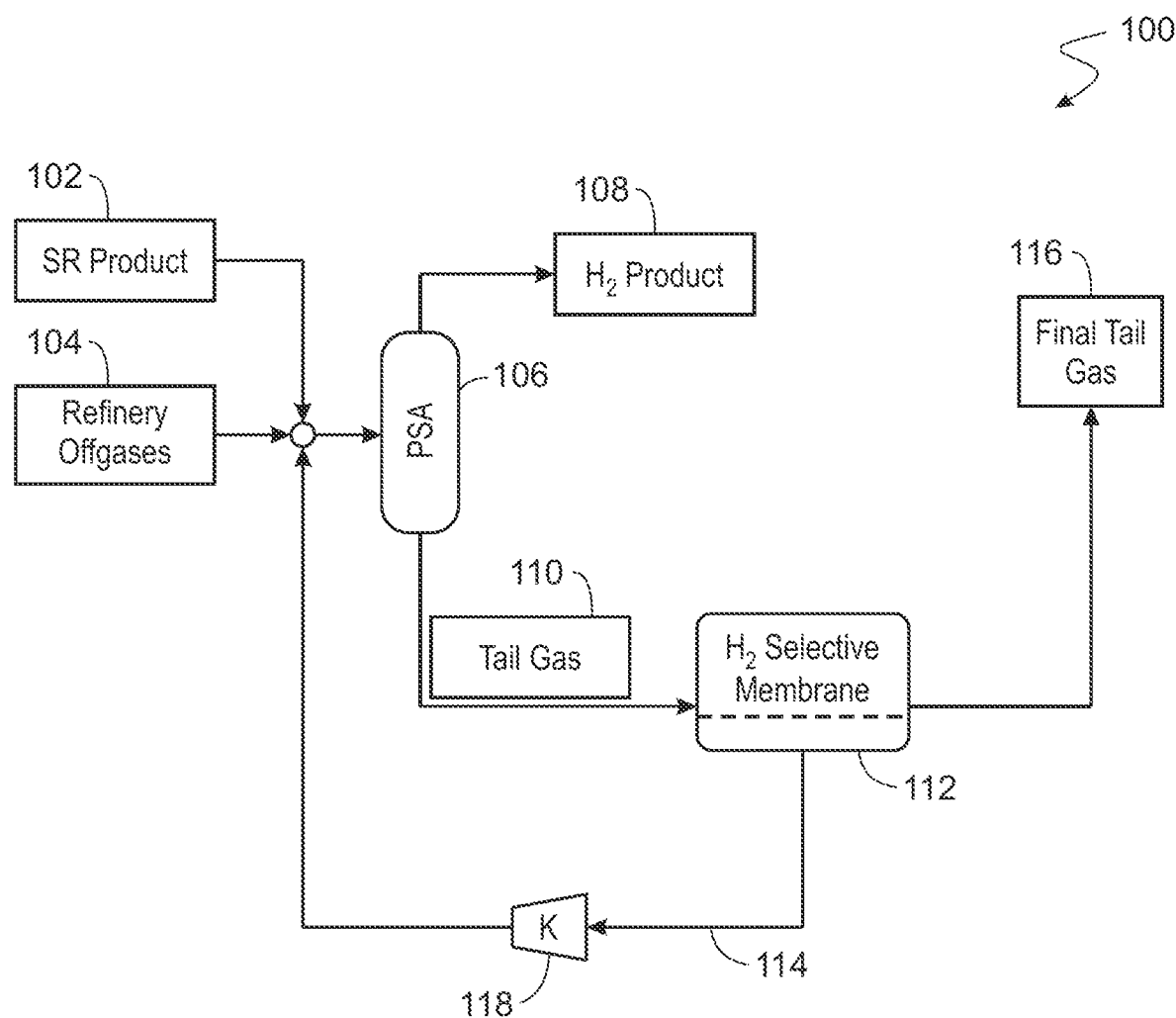
FIG. 1 is a block diagram of a tail gas $H_2$ recovery system.

FIG. 1 is an example of a conventional tail gas $H_2$ recovery system 100. Solid arrows are used in FIG. 1 to indicate gas or liquid flows, e.g., inflow and outflow. Generally, to meet the pure $H_2$ demand, most refineries use multiple $H_2$ production routes, e.g., a refinery off-gas and steam reforming (SR). Pressure swing adsorption (PSA) processes may be employed to separate $H_2$ but some residual $H_2$ escapes in the tail gases. The residual $H_2$ may be recovered from the tail gases using an $H_2$ selective membrane. In FIG. 1, a steam reforming (SR) product gas 102 from a SR process, e.g., steam methane reforming (SMR) and a refinery off-gas 104 are combined and sent to a pressure swing adsorption (PSA) column 106 and separated into an $H_2$ product gas 108 and a tail gas 110. The tail gas 110 is then sent to an $H_2$ selective membrane 112 to form a recovered $H_2$-rich gas 114 and a final tail gas 116. The recovered $H_2$-rich gas 114 is sent to a recycle gas compressor 118 and then looped back to the PSA column 106 for improving the overall $H_2$ recovery. The final tail gas 116, as a retentate stream can be used as a fuel gas.

However, the enrichment rate of $H_2$ in the permeate stream of a membrane process in this conventional method can be limited due to the high $CO_2$ concentration in the tail gas 110. Various embodiments described in this disclosure can improve the overall $H_2$ recovery by employing (1) two PSA columns to separately recover $H_2$ from the two streams, and (2) a $CO_2$ selective membrane to first recover $CO_2$ from the first PSA tail gas, e.g., a $CO_2$-rich gas, before mixing it with the second PSA tail gas, e.g., a $CO_2$-free tail gas.

In the following, various embodiments of the methods and systems of $H_2$ recovery including separate tail gas treatment are described. Embodiments with one $CO_2$ selective membrane is first described referring to FIG. 2, and embodiments with two $CO_2$ selective membranes are then described referring to FIG. 3-4. FIG. 5 is an example process flow diagram. In this disclosure, unless otherwise noted, concentrations of gases components in a fluid are provided based on volumetric concentration in percentile, referred to as %.

Single-Stage $CO_2$ Separation

Figure 2:
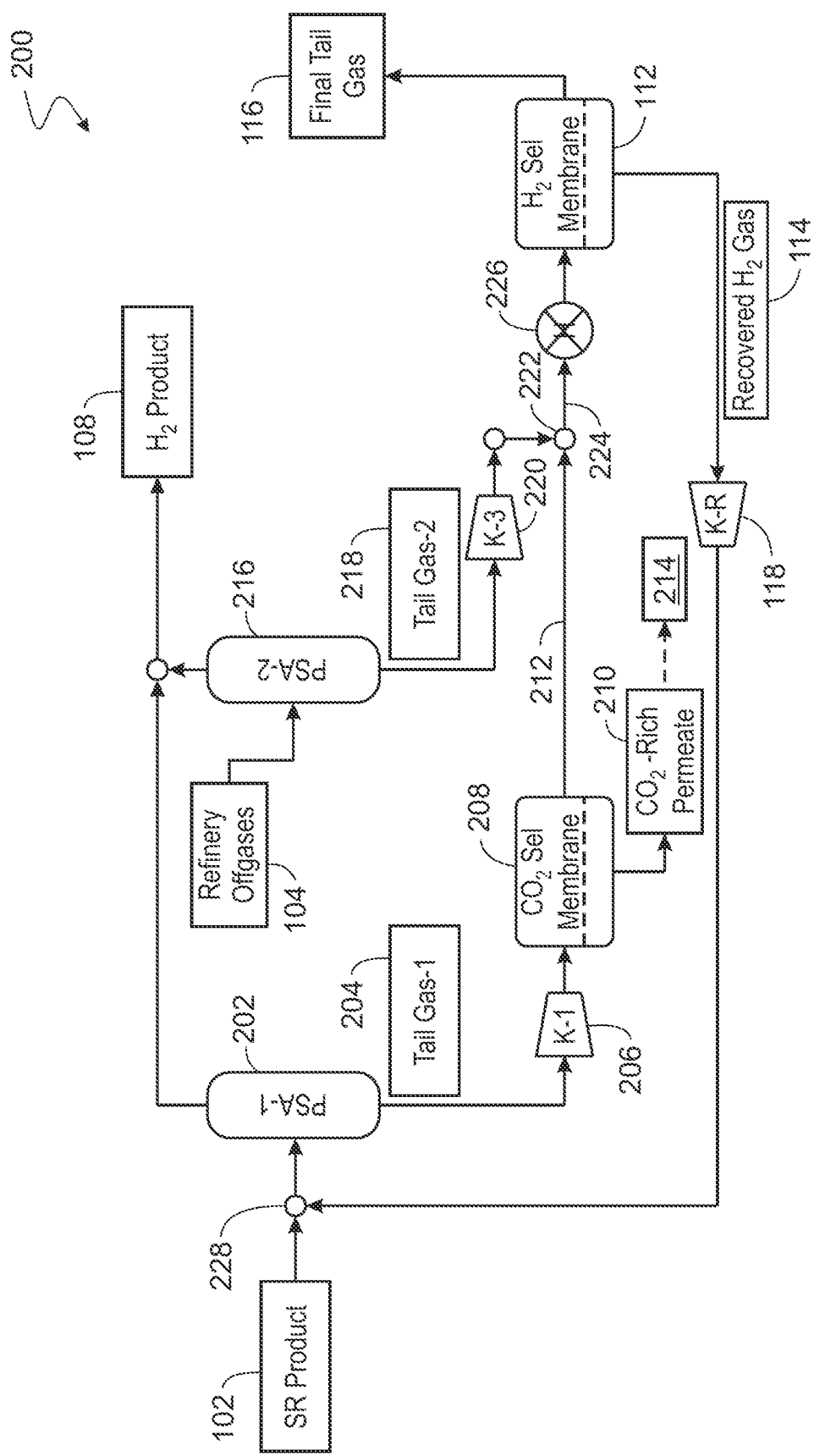
FIG. 2 is a block diagram of a tail gas $H_2$ recovery system with single-stage $CO_2$ separation.

FIG. 2 is an example of a tail gas $H_2$ recovery system 200 with single-stage $CO_2$ separation. In FIG. 2, unlike the conventional method described referring to FIG. 1, two $H_2$-containing gas streams are separately treated with two PSA columns to recover $H_2$. Each PSA yields a tail gas containing residual $H_2$, which can be recovered by the tail gas $H_2$ recovery system 200. The two tail gas compositions are different at least in the $CO_2$ concentration.

First, a steam reforming (SR) process, e.g., steam methane reforming (SMR), generates a SR product gas 102 containing $H_2$ and $CO_2$. Accordingly, in some embodiments, the tail gas $H_2$ recovery system 200 includes a steam reformer to generate the SR product gas 102. The SR process catalytically convert hydrocarbons such as methane, propane, or butane, to a syn-gas, a mixture of $H_2$ and CO. The SR process can include water-gas shift (WGS) reaction between CO and water ($H_2O$) to produce more $H_2$. $CO_2$ is thus generated as a by-product, making $H_2$ and $CO_2$ the main gas components of the SR product gas 102. In various embodiments, the SR product gas 102 contains about 10% to 30% $CO_2$, for example, about 20%. A first pressure swing adsorption (PSA) column 202 processes the SR product gas 102 and generates an $H_2$ product gas 108 and a first PSA tail gas 204. In some embodiments, the first PSA tail gas 204 contains about 30% to about 70% $CO_2$, for example, about 50%. The $CO_2$ concentration of the first PSA tail gas 204 can be greater than that of the SR product gas 102 as a result of the PSA process. The first PSA tail gas 204 is first processed for $CO_2$ recovery prior to mixing with another tail gas.

In various embodiments, as illustrated in FIG. 2, the first PSA tail gas 204 is sent to a first tail gas compressor 206 and then a first $CO_2$ selective membrane 208. In some embodiments, the first PSA tail gas 204 is compressed to have a pressure between about 2 bar (200 kPa) and about 20 bar (2,000 kPa), for example, at about 10 bar (1,000 kPa). The first tail gas compressor 206 can compress the first PSA tail gas 204 to optimize its pressure, e.g., about 10 bar, as a feed gas to the first $CO_2$ selective membrane 208. The first $CO_2$ selective membrane 208 can separate the first PSA tail gas 204 into a $CO_2$-rich permeate gas 210 and a $CO_2$-lean rejected gas 212. The first $CO_2$ selective membrane 208 can include polymer-based rubbery materials such as polyether-polyamide copolymers, e.g., Pebax® polymer, and polydimethylsiloxane (PDMS). In some embodiments, the tail gas $H_2$ recovery system 200 can include a fluid temperature control system to maintain the temperature of the first PSA tail gas 204, e.g., above its dew point to prevent condensation of a water vapor present in the first PSA tail gas 204. In some embodiments, the process temperature for $CO_2$ separation is between about 25° C. and 60° C. In one or more embodiments, the tail gas $H_2$ recovery system 200 can further include, prior to the first $CO_2$ selective membrane 208, an additional pretreatment unit such as heater and carbon bed and particle filter.

In some embodiments, the $CO_2$ concentration in the $CO_2$-rich permeate gas 210 can be about 70-75%, achieving about 95% $CO_2$ recovery from the first PSA tail gas 204. In some embodiments, the $CO_2$-rich permeate gas 210 can be sent to another purification system 214, e.g., a cryogenic distillation system, for further purification to produce a high purity $CO_2$ stream, e.g., >99% $CO_2$.

On the other hand, the residual $H_2$ of the first PSA tail gas 204 is concentrated in the $CO_2$-lean rejected gas 212. Further, other gas components, e.g., methane ($CH_4$), $N_2$, and the like, can also be concentrated in the $CO_2$-lean rejected gas 212.

Still referring to FIG. 2, a second PSA column 216 is used to separate a refinery off-gas 104 into the $H_2$ product gas 108 and a second PSA tail gas 218. Although not specifically illustrated in FIG. 2, the tail gas $H_2$ recovery system 200 includes an $H_2$ production facility to generate the refinery off-gas 104. Further, the refinery off-gas 104 can be processed in one or more upstream facilities for acid gas removal, e.g., $H_2S$ and $CO_2$. For example, an amine-based stripper, e.g., a diglycolamine absorber (DGA) unit, can be used. With the acid removal, the refinery off-gas 104 becomes a so-called "sweetened" product stream. Accordingly, in various embodiments, the second PSA tail gas 218 is a $CO_2$-free gas. In this disclosure, a gas is considered $CO_2$-free if the $CO_2$ concentration is below 0.1%. The second PSA tail gas 218 is then compressed by a second tail gas compressor 220. In some embodiments, the second PSA tail gas 218 is compressed to have a pressure between about 2 bar (200 kPa) and about 20 bar (2,000 kPa), for example, at about 10 bar (1,000 kPa).

The $CO_2$-lean rejected gas 212 from the first $CO_2$ selective membrane 208 and the second PSA tail gas 218 from the second PSA column 216 can be mixed using a tail gas mixer 222 to form a mixed tail gas 224. The mixed tail gas 224 is then sent to a heater 226 and an $H_2$ selective membrane 112 to form a recovered $H_2$-rich gas 124 and a final tail gas 116. In various embodiments, the mixed tail gas 224 is heated to between about 60° C. and 200° C., for example, about 150° C. The $H_2$ selective membrane 112 can include a polymer-based membrane in a glassy form, or a dense protonic ceramic membrane based on a single-phase and mixed-phase perovskite-type oxidic protonic ceramic material.

In various embodiments, the recovered $H_2$-rich gas 114 is obtained as a permeate gas. The recovered $H_2$-rich gas 114 can be sent to a recycle gas compressor 118 and then looped back to be mixed using a feed gas mixer 228 with the SR product gas 102 for improving the overall $H_2$ recovery. In some embodiments, the recovered $H_2$-rich gas 114 is compressed to have a pressure at a same level of the SR product gas 102 that is being fed to the first PSA column 202, e.g., between about 2 bar (200 kPa) and about 40 bar (4,000 kPa), for example, at about 20 bar (2,000 kPa).

On the other hand, the final tail gas 116 is obtained as a rejected gas. The final tail gas 116 can contain about 30-50% of $CH_4$ or other hydrocarbons and 10-15% $H_2$. The final tail gas 116 can be used, for example, as a fuel gas, mixed with a sale gas stream, or recycled as an additive to a feed to the steam reforming (SR) process. In some embodiments, especially when the heating value is not sufficient for other applications, the final tail gas 116 can be sent to an amine-based $CO_2$ removal facility. By integrating the $CO_2$ separation as a part of $H_2$ recovery, the final tail gas 116 contains less $CO_2$ compared to the conventional methods, thereby improving its heating value.

Figure 3:
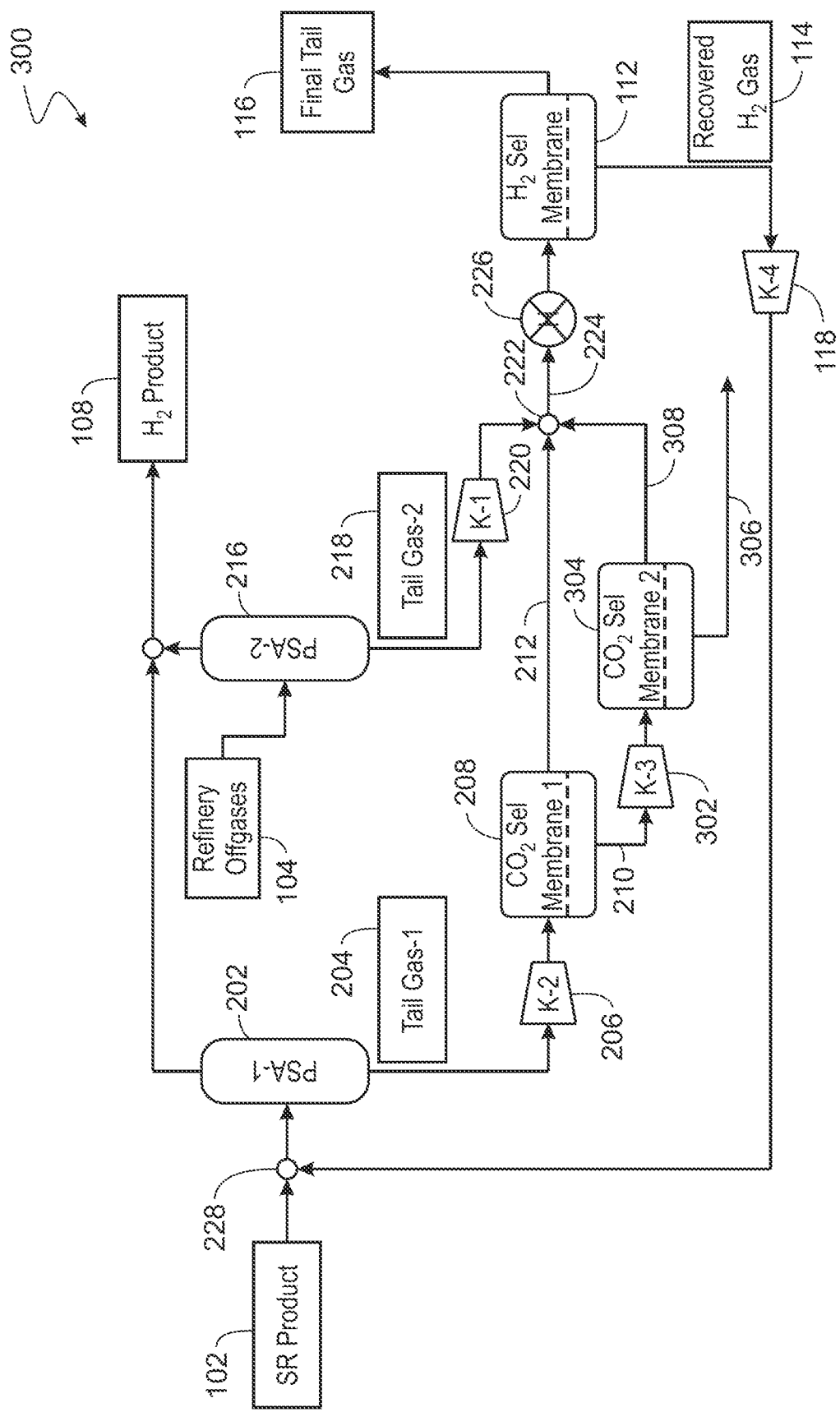
FIG. 3 is a block diagram of a tail gas $H_2$ recovery system with two-stage $CO_2$ separation.

In various embodiments, the tail gas $H_2$ recovery process with $CO_2$ separation can reduce the membrane area required for the $H_2$ selective membrane 112 compared to the conventional methods, thereby also reducing the overall capital expenditure for $H_2$ recovery Two-Stage $CO_2$ Separation FIG. 3 is an example of a tail gas $H_2$ recovery system 300 with two-stage $CO_2$ separation. Like numbered items are as described with respect to FIG. 2 and will not be repeated in detail. In FIG. 3, the tail gas $H_2$ recovery system 300 uses two $CO_2$ selective membranes in series for two-stage $CO_2$ separation. The $H_2$ production stage can be identical to prior embodiments described referring to FIG. 2. An $H_2$ product gas 108 is obtained from each of a SR product gas 102 and a refinery off-gas 104 using a first PSA column 202 and a second PSA column 216, respectively. Further, the first PSA tail gas 204 is separated using a first $CO_2$ selective membrane 208 into a $CO_2$-rich permeate gas 210 and a $CO_2$-lean rejected gas 212.

Unlike the prior embodiments described referring to FIG. 2, in FIG. 3, the $CO_2$-rich permeate gas 210 is processed for further $H_2$ recovery. Using two $CO_2$ selective membranes, it is possible to further concentrate the $CO_2$ in the tail gas, e.g., the $CO_2$-rich permeate gas 210 while recovering more $H_2$ in the reject sides of both membranes. The $CO_2$-rich permeate gas 210 is sent to a third tail gas compressor 302 for compression and then to a second $CO_2$ selective membrane 304 that generates a second $CO_2$-rich permeate gas 306 and a second $CO_2$-lean rejected gas 308. In some embodiments, the second $CO_2$-rich permeate gas 306 contains about 90% $CO_2$. The second $CO_2$-lean rejected gas 308 and the $CO_2$-lean rejected gas 212 can be mixed using a tail gas mixer 222 with the second PSA tail gas 218 to form a mixed tail gas 224. The mixed tail gas 224 can be processed for $H_2$ recovery in the same way as described above referring to FIG. 2.

In various embodiments, the second $CO_2$ selective membrane 304 can include polymer-based rubbery materials such as polyether-polyamide copolymers, e.g., Pebax® polymer and polydimethylsiloxane (PDMS). In some embodiments, the second $CO_2$ selective membrane 304 can use the same membrane material as the first $CO_2$ selective membrane 208, but it is not necessary. The membrane area can be larger in the first $CO_2$ selective membrane 208 than the second $CO_2$ selective membrane 304. In some embodiments, the $CO_2$-rich permeate gas 210 after the first $CO_2$ separation has a pressure of about 1 bar (100 kPa), which can be compressed again using the third tail gas compressor 302 to have a pressure between about 2 bar (200 kPa) and about 20 bar (2,000 kPa), for example, at about 10 bar (1,000 kPa), prior to the second $CO_2$ separation. In one or more embodiments, the tail gas $H_2$ recovery system 300 can include one or more additional pretreatment units between the first $CO_2$ selective membrane 208 and the second $CO_2$ selective membrane 304.

Figure 4:
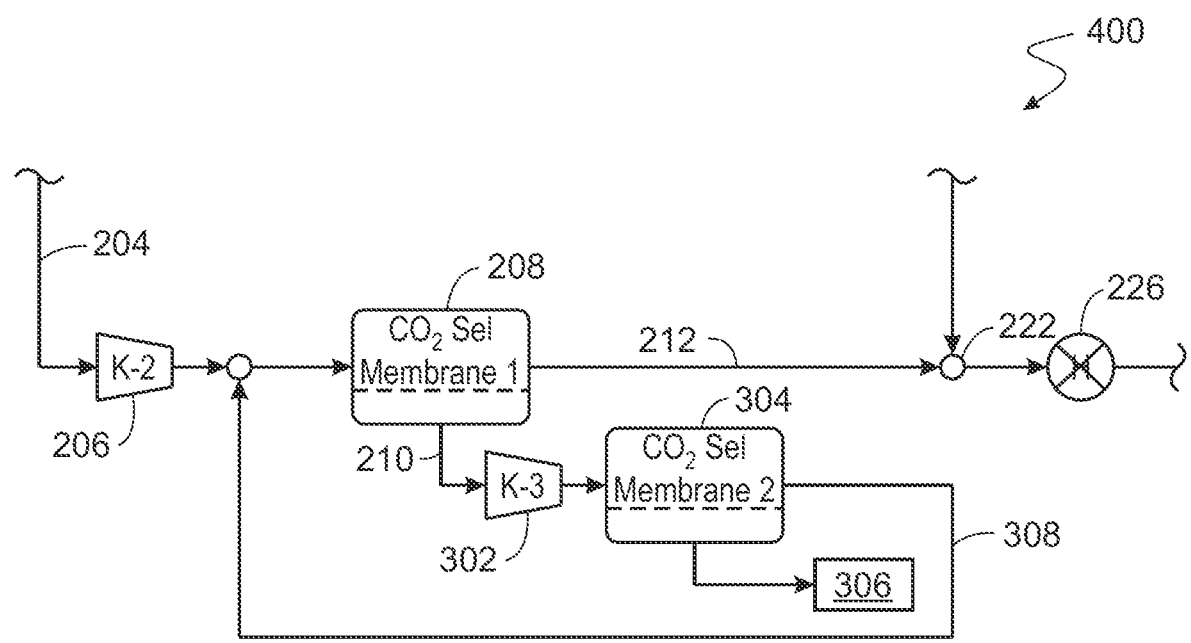
FIG. 4 is a block diagram of a tail gas $H_2$ recovery system with two-stage $CO_2$ separation.
Figure 5:
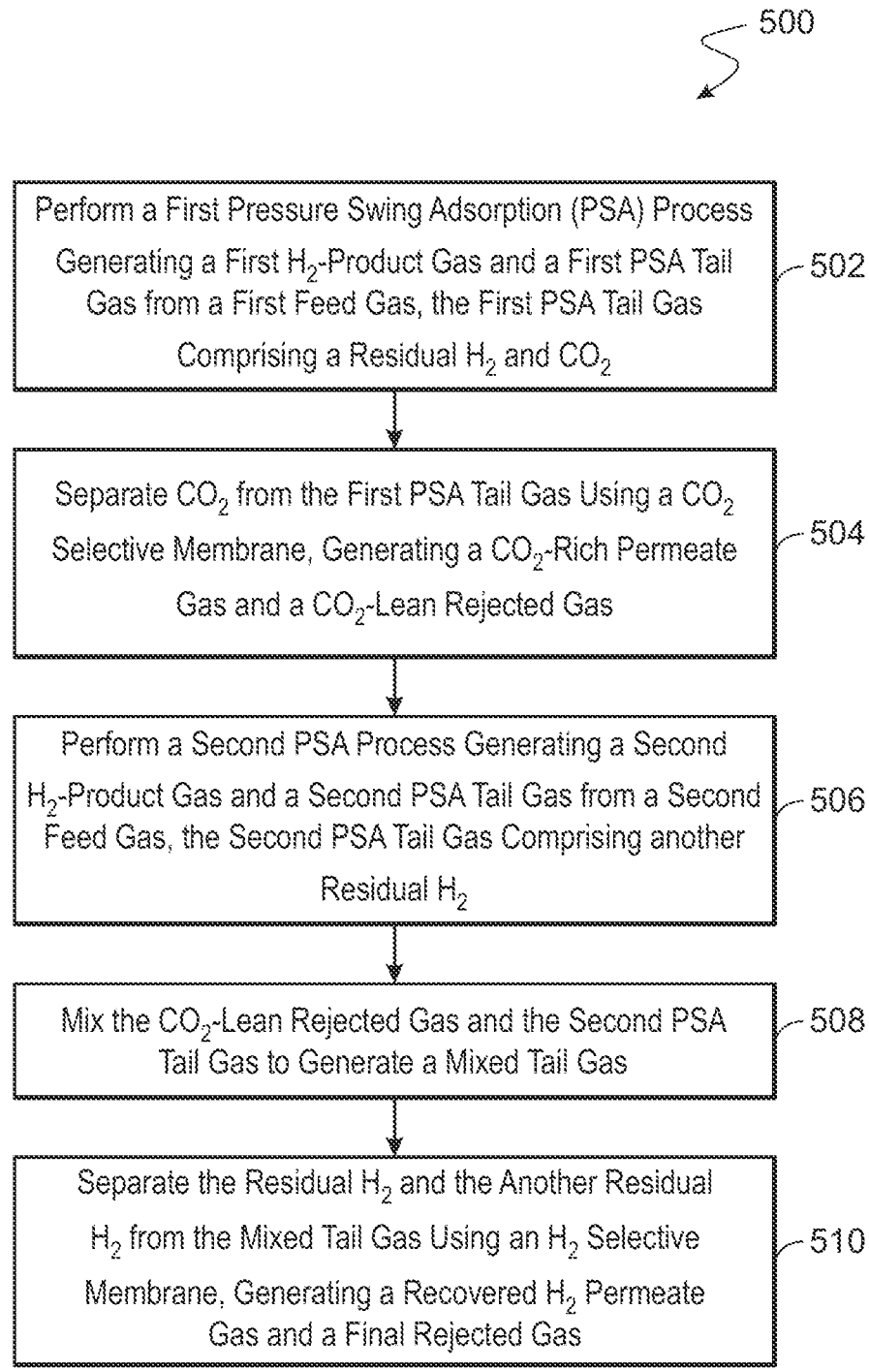
FIG. 5 is an example process flow diagram of a method of tail gas $H_2$ recovery.

FIG. 4 is an example of a part of a tail gas $H_2$ recovery system 400 with two-stage $CO_2$ separation. Like numbered items are as described with respect to FIGS. 2-3 and will not be repeated in detail. In FIG. 4, some components of the tail gas $H_2$ recovery system 400, e.g., PSA columns and $H_2$ selective membrane, are omitted for illustration purpose.

In FIG. 4, the second $CO_2$-lean rejected gas 308 is sent back to be added to a feed gas to the first $CO_2$ selective membrane 208. Accordingly, the second $CO_2$-lean rejected gas 308 is mixed with the first PSA tail gas 204 in FIG. 4 instead of mixing with the $CO_2$-lean rejected gas 212 as described in FIG. 3.

In FIG. 2-4, the recovered $H_2$-rich gas 114 is sent back to be mixed with the SR product gas 102 for improving the overall $H_2$ recovery and $CO_2$ capture. By this loop, any residual $CO_2$ in the recovered $H_2$-rich gas 114 can be subject to another cycle of $CO_2$ separation after the first PSA column 202. In some embodiments, although not specifically illustrated in FIGS. 2-4, the recovered $H_2$-rich gas 114 can instead be sent back and mixed with the refinery off-gas 104 to be treated with the second PSA column 216.

FIG. 5 is a process flow diagram of a method 500 of tail gas $H_2$ recovery. In FIG. 5, the method 500 starts with performing a first pressure swing adsorption (PSA) process 502 generating a first $H_2$-product gas and a first PSA tail gas from a first feed gas, where the first PSA tail gas includes a residual $H_2$ and $CO_2$. Subsequently, $CO_2$ is separated 504 from the first PSA tail gas using a $CO_2$ selective membrane, generating a $CO_2$-rich permeate gas and a $CO_2$-lean rejected gas. A second PSA process is performed 506 generating a second $H_2$-product gas and a second PSA tail gas from a second feed gas, where the second PSA tail gas includes another residual $H_2$. Next, the $CO_2$-lean rejected gas and the second PSA tail gas are mixed 508 to generate a mixed tail gas, followed by separating 510 $H_2$ in the mixed tail gas using an $H_2$ selective membrane, generating a recovered $H_2$ permeate gas and a final rejected gas.

EXAMPLES

The $H_2$ recovery and $CO_2$ separation was simulated by Aspen HYSYS® V12 to examine its efficiency in an example of two tail gas treatment in accordance with an embodiment. Membrane unit was designed using the Saudi Aramco proprietary Industrial Membrane Process Simulator (IMPS) (External extension within HYSYS). Two feed gasses, a steam reforming (SR) product gas and a refinery off-gas, are first simulated for PSA processes. Table 1 summarizes the two feed gas compositions and the tail gas compositions after the PSA processes. It was confirmed that both tail gases 1 and 2 still contain residual $H_2$ at 26% and 42%, respectively, after the PSA processes. Further, the tail gas 1 contains 47% $CO_2$ while the tail gas 2 does not contain any $CO_2$.

TABLE 1

Aspen HYSYS ® simulation results for PSA process.

|  | SR product gas | Refinery off-gas | Tail gas 1 (from SR) | Tail gas 2 (from off-gas) |
|---|---|---|---|---|
| Temp. (° F.) | 105.0 | 105.0 | 101.4 | 102.9 |
| Press. (bar) | 20.0 | 20.0 | 1.5 | 1.5 |
| Molar flow (lb-mole/h) | $1.0 \times 10^4$ | $1.0 \times 10^4$ | 4341.5 | 2603.5 |
| Mass flow (ton/day) | 1326.0 | 708.1 | 1251.1 | 545.3 |
| $H_2$ (%) | 70.00 | 85.00 | 26.34 | 42.4 |
| CO (%) | 3.00 | 0.00 | 7.05 | 0.00 |
| $CO_2$ (%) | 20.00 | 0.00 | 47.32 | 0.00 |
| $CH_4$ (%) | 6.80 | 5.00 | 18.65 | 19.19 |
| $C_2H_6$ (%) | 0.00 | 5.00 | 0.13 | 19.19 |
| $C_3H_8$ (%) | 0.00 | 3.00 | 0.04 | 11.51 |
| $C_4H_{10}$ (%) | 0.00 | 2.00 | 0.01 | 7.67 |
| $H_2O$ (%) | 0.20 | 0.00 | 0.46 | 0.00 |

Further, the $H_2$ recovery and $CO_2$ separation from these tail gases using two-stage $CO_2$ separation were simulated. Membrane permeance used in the simulation and the result of the simulation are summarized in Tables 2 and 3, respectively. The $CO_2$ separation from the tail 1 using two $CO_2$ selective membranes was simulated at following process conditions: temperature at 105° F. (40.6° C.) and pressure at 10.0 bar. The first permeated gas (permeate $CO_2$-1) is sent to the second $CO_2$ selective membrane. The rejected gases from the two $CO_2$ selective membranes (rejected $CO_2$-1 and rejected $CO_2$-2) are combined for the subsequent $H_2$ separation using an $H_2$ selective membrane simulated at a temperature of 300° F. (148.9° C.) and a pressure of 10 bar. The residual $H_2$ present in the two tail gases is recovered as the permeate gas. The unrecovered $H_2$ is 6.8% $H_2$ in the final $CO_2$ permeate (permeate $CO_2$-2 in Table 3) and 10.7% $H_2$ in the rejected gas after the $H_2$ separation. Based on the initial volume of $H_2$ in the two feed gases, the PSA processes followed by the tail gas $H_2$ recovery yielded about 97% $H_2$ recovery. The use of this tail gas $H_2$ recovery process improved the $H_2$ recovery from about 85%. On the other hand, the $CO_2$ in the tail gas 1 is recovered as the final $CO_2$ permeate (permeate $CO_2$-2 in Table 3). A high concentration of about 90% $CO_2$ is obtained, and more than 85% of $CO_2$ is recovered. Consequently, the final tail gas contains about 38% methane and only about 8% $CO_2$, this tail gas has a heating value greater than a tail gas from a conventional process.

TABLE 2

Membrane permeance used in Aspen HYSYS ® simulation.

|  | $CO_2$ selective membrane (GPU) | $H_2$ selective membrane (GPU) |
|---|---|---|
| $H_2$ | 37.5 | 300 |
| $N_2$ | 10 | 10 |
| CO | 20 | 2 |
| $CO_2$ | 300 | 30 |
| $CH_4$ | 20 | 10 |
| $C_2H_6$ | 50 | 1 |

TABLE 3

Aspen HYSYS ® simulation results for tail gas $H_2$ recovery using two-stage $CO_2$ separation.

|  | Rejected $CO_2$-1 | Permeate $CO_2$-1 | Rejected $CO_2$-2 | Permeate $CO_2$-2 | Rejected $H_2$ | Permeate $H_2$ |
|---|---|---|---|---|---|---|
| Temp. (° F.) | 105.0 | 105.0 | 105.0 | 105.0 | 300.0 | 300.0 |
| Press. (bar) | 10.0 | 1.0 | 10.0 | 1.0 | 10.0 | 1.0 |
| Molar flow (lb-mole/h) | 1860.6 | 2480.9 | 521.7 | 1959.2 | 2991.3 | 1994.4 |
| Mass flow (ton/day) | 299.5 | 951.5 | 92.0 | 859.5 | 842.9 | 93.3 |
| $H_2$ (%) | 41.20 | 15.18 | 46.65 | 6.81 | 10.74 | 89.94 |
| CO (%) | 13.21 | 2.43 | 9.10 | 0.65 | 9.59 | 0.32 |
| $CO_2$ (%) | 10.41 | 75.01 | 19.85 | 89.69 | 8.06 | 2.82 |
| $CH_4$ (%) | 34.96 | 6.42 | 24.08 | 1.71 | 38.29 | 6.52 |
| $C_2H_6$ (%) | 0.18 | 0.09 | 0.24 | 0.05 | 16.66 | 0.28 |
| $C_3H_8$ (%) | 0.03 | 0.05 | 0.06 | 0.04 | 9.99 | 0.08 |
| $C_4H_{10}$ (%) | 0.00 | 0.02 | 0.00 | 0.02 | 6.66 | 0.03 |
| $H_2O$ (%) | 0.01 | 0.81 | 0.01 | 1.02 | 0.00 | 0.01 |

EMBODIMENTS

An embodiment described herein provides a method of treating a gas stream, where the method includes: performing a first pressure swing adsorption (PSA) process generating a first $H_2$-product gas and a first PSA tail gas from a first feed gas, the first PSA tail gas including a residual $H_2$ and $CO_2$; separating $CO_2$ from the first PSA tail gas using a $CO_2$ selective membrane, generating a $CO_2$-rich permeate gas and a $CO_2$-lean rejected gas; performing a second PSA process generating a second $H_2$-product gas and a second PSA tail gas from a second feed gas, the second PSA tail gas including another residual $H_2$; mixing the $CO_2$-lean rejected gas and the second PSA tail gas to generate a mixed tail gas; and separating the residual $H_2$ and the another residual $H_2$ from the mixed tail gas using an $H_2$ selective membrane, generating a recovered $H_2$ permeate gas and a final rejected gas.

In an aspect, combinable with any other aspect, the method further includes mixing the recovered $H_2$ permeate gas with the first feed gas.

In an aspect, combinable with any other aspect, the method further includes compressing the first PSA tail gas prior to separating the $CO_2$ from the first PSA tail gas.

In an aspect, combinable with any other aspect, the method further includes passing the $CO_2$-rich permeate gas through another $CO_2$ selective membrane, generating another $CO_2$-rich permeate gas and another $CO_2$-lean rejected gas.

In an aspect, combinable with any other aspect, the method further includes compressing the $CO_2$-rich permeate gas prior to passing the $CO_2$-rich permeate gas through the another $CO_2$ selective membrane.

In an aspect, combinable with any other aspect, the method further includes adding the another $CO_2$-lean rejected gas to the mixed tail gas prior to separating the $H_2$ from the mixed tail gas.

In an aspect, combinable with any other aspect, the method further includes adding the another $CO_2$-lean rejected gas to the first PSA tail gas or the second PSA tail gas.

In an aspect, combinable with any other aspect, the method further includes performing a steam reforming, generating the first feed gas.

In an aspect, combinable with any other aspect, a $CO_2$ concentration of the first feed gas is between 10% and 30%.

In an aspect, combinable with any other aspect, a $CO_2$ concentration of the second feed gas is 0.1% or less.

An embodiment described herein provides a gas treatment system that includes: a first pressure swing adsorption (PSA) column to generate a first $H_2$-product gas and a first PSA tail gas from a first feed gas, the first PSA tail gas including $CO_2$ and a residual $H_2$; a $CO_2$ selective membrane, connected to the first PSA column and configured to separate $CO_2$ from the first PSA tail gas, generating a $CO_2$-rich permeate gas and a $CO_2$-lean rejected gas; a second PSA column to generate a second $H_2$-product gas and a second PSA tail gas from a second feed gas, the second PSA tail gas including another residual $H_2$; a tail gas mixer to mix the $CO_2$-lean rejected gas and the second PSA tail gas, generating a mixed tail gas; and an $H_2$ selective membrane to separate the residual $H_2$ and the another residual $H_2$ from the mixed tail gas using an $H_2$ selective membrane, generating a recovered $H_2$ permeate gas and a final rejected gas.

In an aspect, combinable with any other aspect, the gas treatment system further includes: a first compressor between the first PSA column and the $CO_2$ selective membrane; and a second compressor between the second PSA column and the $H_2$ selective membrane.

In an aspect, combinable with any other aspect, the gas treatment system further includes: another $CO_2$ selective membrane to receive the $CO_2$-rich permeate gas from the $CO_2$ selective membrane, generating another $CO_2$-rich permeate gas and another $CO_2$-lean rejected gas; and a third compressor between the $CO_2$ selective membrane and the another $CO_2$ selective membrane.

In an aspect, combinable with any other aspect, the tail gas mixer is configured to add the another $CO_2$-lean rejected gas to the mixed tail gas.

In an aspect, combinable with any other aspect, the gas treatment system further includes a $CO_2$ mixer between the first PSA column and the $CO_2$ selective membrane, where the $CO_2$ mixer is configured to add the another $CO_2$-lean rejected gas to the first PSA tail gas.

In an aspect, combinable with any other aspect, the gas treatment system further includes a heater to heat the mixed tail gas, where the heater is between the mixer and the $H_2$ selective membrane.

In an aspect, combinable with any other aspect, the gas treatment system further includes a feed mixer to add the recovered $H_2$ permeate gas to the first feed gas.

An embodiment described herein provides an $H_2$ recovery system that includes: a steam reformer to generate a first feed gas including $H_2$ and $CO_2$, where a $CO_2$ concentration of the first feed gas is between 10% and 30%; a first pressure swing adsorption (PSA) column to generate a first $H_2$-product gas and a first PSA tail gas from the first feed gas, the first PSA tail gas including the $CO_2$ and a residual $H_2$; a $CO_2$ selective membrane, connected to the first PSA column and configured to separate $CO_2$ from the first PSA tail gas, generating a $CO_2$-rich permeate gas and a $CO_2$-lean rejected gas; an $H_2$ production facility to generate a second feed gas including $H_2$, where a $CO_2$ concentration of the second feed gas is less than 0.1%; a second PSA column to generate a second $H_2$-product gas and a second PSA tail gas from the second feed gas, the second PSA tail gas including another residual $H_2$; a tail gas mixer to mix the $CO_2$-lean rejected gas and the second PSA tail gas, generating a mixed tail gas; an $H_2$ selective membrane to separate the residual $H_2$ and the another residual $H_2$ from the mixed tail gas using an $H_2$ selective membrane, generating a recovered $H_2$ permeate gas and a final rejected gas; and a feed gas mixer to add the recovered $H_2$ permeate gas to the first feed gas.

In an aspect, combinable with any other aspect, the $H_2$ recovery system further includes another $CO_2$ selective membrane to receive the $CO_2$-rich permeate gas from the $CO_2$ selective membrane, generating another $CO_2$-rich permeate gas and another $CO_2$-lean rejected gas.

In an aspect, combinable with any other aspect, the $H_2$ recovery system further includes a cryogenic distillation system to purify the another $CO_2$-rich permeate gas from the another $CO_2$ selective membrane.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of treating a gas stream, the method comprising:
    performing a first pressure swing adsorption (PSA) process generating a first $H_2$-product gas and a first PSA tail gas from a first feed gas, the first PSA tail gas comprising a residual $H_2$ and $CO_2$;
    separating $CO_2$ from the first PSA tail gas using a $CO_2$ selective membrane, generating a $CO_2$-rich permeate gas and a $CO_2$-lean rejected gas;
    performing a second PSA process generating a second $H_2$-product gas and a second PSA tail gas from a second feed gas, the second PSA tail gas comprising another residual $H_2$;
    mixing the $CO_2$-lean rejected gas and the second PSA tail gas to generate a mixed tail gas; and
    separating the residual $H_2$ and the another residual $H_2$ from the mixed tail gas using an $H_2$ selective membrane, generating a recovered $H_2$ permeate gas and a final rejected gas.

2. The method of claim 1, further comprising mixing the recovered $H_2$ permeate gas with the first feed gas.

3. The method of claim 1, further comprising compressing the first PSA tail gas prior to separating the $CO_2$ from the first PSA tail gas.

4. The method of claim 1, further comprising passing the $CO_2$-rich permeate gas through another $CO_2$ selective membrane, generating another $CO_2$-rich permeate gas and another $CO_2$-lean rejected gas.

5. The method of claim 4, further comprising compressing the $CO_2$-rich permeate gas prior to passing the $CO_2$-rich permeate gas through the another $CO_2$ selective membrane.

6. The method of claim 4, further comprising adding the another $CO_2$-lean rejected gas to the mixed tail gas prior to separating the $H_2$ from the mixed tail gas.

7. The method of claim 4, further comprising adding the another $CO_2$-lean rejected gas to the first PSA tail gas or the second PSA tail gas.

8. The method of claim 1, further comprising performing a steam reforming, generating the first feed gas.

9. The method of claim 1, wherein a $CO_2$ concentration of the first feed gas is between 10% and 30%.

10. The method of claim 1, wherein a $CO_2$ concentration of the second feed gas is 0.1% or less.

11. A gas treatment system comprising:
    a first pressure swing adsorption (PSA) column to generate a first $H_2$-product gas and a first PSA tail gas from a first feed gas, the first PSA tail gas comprising $CO_2$ and a residual $H_2$;
    a $CO_2$ selective membrane, connected to the first PSA column and configured to separate $CO_2$ from the first PSA tail gas, generating a $CO_2$-rich permeate gas and a $CO_2$-lean rejected gas;
    a second PSA column to generate a second $H_2$-product gas and a second PSA tail gas from a second feed gas, the second PSA tail gas comprising another residual $H_2$;
    a tail gas mixer to mix the $CO_2$-lean rejected gas and the second PSA tail gas, generating a mixed tail gas; and
    an $H_2$ selective membrane to separate the residual $H_2$ and the another residual $H_2$ from the mixed tail gas using an $H_2$ selective membrane, generating a recovered $H_2$ permeate gas and a final rejected gas.

12. The gas treatment system of claim 11, further comprising:
    a first compressor between the first PSA column and the $CO_2$ selective membrane; and
    a second compressor between the second PSA column and the $H_2$ selective membrane.

13. The gas treatment system of claim 11, further comprising:
    another $CO_2$ selective membrane to receive the $CO_2$-rich permeate gas from the $CO_2$ selective membrane, generating another $CO_2$-rich permeate gas and another $CO_2$-lean rejected gas; and
    a third compressor between the $CO_2$ selective membrane and the another $CO_2$ selective membrane.

14. The gas treatment system of claim 13, wherein the tail gas mixer is configured to add the another $CO_2$-lean rejected gas to the mixed tail gas.

15. The gas treatment system of claim 13, further comprising a $CO_2$ mixer between the first PSA column and the $CO_2$ selective membrane, the $CO_2$ mixer configured to add the another $CO_2$-lean rejected gas to the first PSA tail gas.

16. The gas treatment system of claim 11, further comprising a heater to heat the mixed tail gas, the heater being between the mixer and the $H_2$ selective membrane.

17. The gas treatment system of claim 11, further comprising a feed mixer to add the recovered $H_2$ permeate gas to the first feed gas.

18. An $H_2$ recovery system comprising:
    a steam reformer to generate a first feed gas comprising $H_2$ and $CO_2$, wherein a $CO_2$ concentration of the first feed gas is between 10% and 30%;
    a first pressure swing adsorption (PSA) column to generate a first $H_2$-product gas and a first PSA tail gas from the first feed gas, the first PSA tail gas comprising the $CO_2$ and a residual $H_2$;
    a $CO_2$ selective membrane, connected to the first PSA column and configured to separate $CO_2$ from the first PSA tail gas, generating a $CO_2$-rich permeate gas and a $CO_2$-lean rejected gas;
    an $H_2$ production facility to generate a second feed gas comprising $H_2$, wherein a $CO_2$ concentration of the second feed gas is less than 0.1%;
    a second PSA column to generate a second $H_2$-product gas and a second PSA tail gas from the second feed gas, the second PSA tail gas comprising another residual $H_2$;
    a tail gas mixer to mix the $CO_2$-lean rejected gas and the second PSA tail gas, generating a mixed tail gas;
    an $H_2$ selective membrane to separate the residual $H_2$ and the another residual $H_2$ from the mixed tail gas using an $H_2$ selective membrane, generating a recovered $H_2$ permeate gas and a final rejected gas; and
    a feed gas mixer to add the recovered $H_2$ permeate gas to the first feed gas.

19. The $H_2$ recovery system of claim 18, further comprising another $CO_2$ selective membrane to receive the $CO_2$-rich permeate gas from the $CO_2$ selective membrane, generating another $CO_2$-rich permeate gas and another $CO_2$-lean rejected gas.

20. The $H_2$ recovery system of claim 19, further comprising a cryogenic distillation system to purify the another $CO_2$-rich permeate gas from the another $CO_2$ selective membrane.

* * * * *